April 7, 1970 R. L. BOWAR ET AL 3,505,534

TRANSISTOR CIRCUIT HAVING D.C. ISOLATED OUTPUT TRANSISTOR

Filed June 15, 1966 2 Sheets-Sheet 1

Raymond L. Bowar
Glenn E. Jenkins,
INVENTORS.
Harry M. Saragovitz
BY Edward J. Kelly
Herbert Berl
Aubrey J. Dunn Raymond L. Bowar
Glenn E. Jenkins,
INVENTORS.
BY Harry M. Saragovitz
Edward J. Kelly
Herbert Berl
Aubrey J. Dunn United States Patent Office 3,505,534
Patented Apr. 7, 1970

3,505,534
TRANSISTOR CIRCUIT HAVING D.C. ISOLATED OUTPUT TRANSISTOR

Raymond L. Bowar and Glenn E. Jenkins, St. Paul, Minn., assignors, by mesne assignments, to the United States of America as represented by the Secretary of the Army Filed June 15, 1966, Ser. No. 559,044
Int. Cl. H02h *7/20;* H03k *5/08*
U.S. Cl. 307—202 2 Claims

ABSTRACT OF THE DISCLOSURE

The invention, in its simplest form, includes a first normally conducting transistor which is made nonconducting in the presence of a signal voltage. The turning-off of this first transistor causes a second normally nonconducting transistor to begin conduction. The second transistor is transformer-coupled to a third normally nonconducting power transistor, which is turned on when the second transistor begins conduction. It can thus be seen, because of the transformer isolation between the second and third transistors, that a supply voltage different from that used for the first and second transistors could be used for the third transistor. Also, with the use of transformer coupling between the second and third transistors, an excessively long signal voltage will not damage the third transistor, because of a drooping of voltage through the transformer, which will allow the said third transistor to cut off and not exceed its power rating.

An alternate embodiment of the invention includes additional circuit elements associated with said third transistor to provide a regulating feature for the current through said third transistor.

An object of the invention is to provide a transistor trigger circuit in which the output transistor cannot be damaged by an excessively long input.

Another object of the invention is to provide a trigger circuit which is usable over a wide range of voltages.

These and other objects will be best understood by reference to the following description, taken in conjunction with the drawings, in which.

Figure 1:
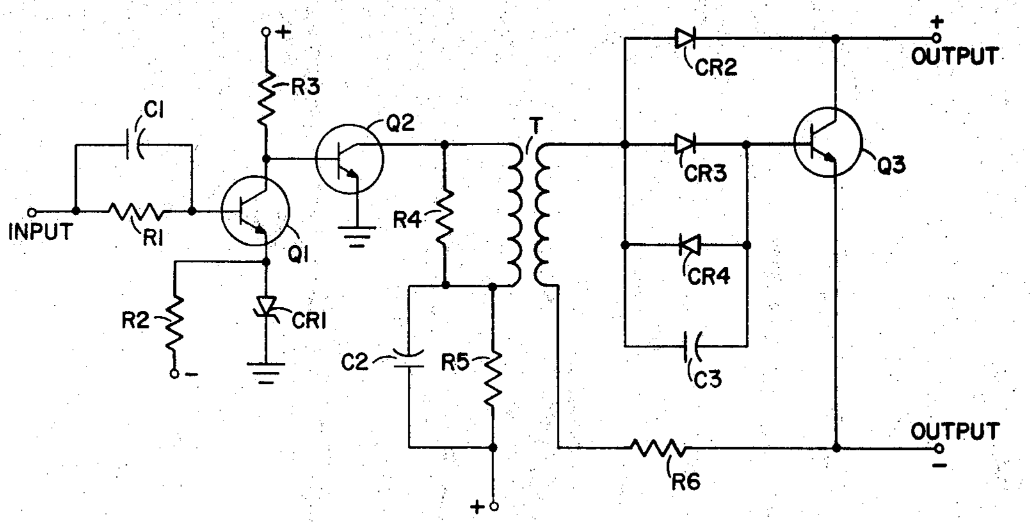
FIGURE 1 shows a preferred embodiment of the circuit of the invention.

Referring now to FIGURE 1, a first transistor designated Q1 has an input connected thereto through resistor R1 and capacitor C1. Resistor R1 acts as a current limiter for the base drive of Q1, and C1 is a speedup capacitor to help decrease the turn-off time of Q1. Transistor Q1 is normally conducting and is turned off by a negative signal at the input terminal. Also associated with Q1 are resistors R2 and R3 and Zener diode CR1. CR1 establishes a negative reference voltage for Q1, and R2 limits the current through CR1 when Q1 is off and accepts current from Q1 when Q1 is on. When Q1 turns off, transistor Q2 turns on and drives transformer T, which, in turn, drives power transistor Q3. Resistor R3 limits the base drive of Q2 when Q1 is off. When Q1 is on, it saturates, with the collector going to negative voltage, holding Q2 off, and with the current through Q1 going through R2 to the negative supply.

Associated with Q2 and T are resistors R4 and R5 and capacitor C2. R4 is a damping resistor for T. R5 limits the current through transformer T from the collector of Q2. In the event of a very long input pulse, R5 would prevent damage to Q2 or T from continuous conduction of Q2.

Included in circuit with transistor Q3 are diodes CR2, CR3, CR4, resistor R6 and capacitor C3. CR2 and CR3 combine to provide an antisaturation circuit for Q3 so that the collector of Q3 cannot go more negative than the base thereof. CR4 provides a path around CR3 for the turn-on current of Q3. C3 is a speedup capacitor to decrease the current rise time at the base of transistor Q3. The output of Q3 is taken as indicated on the figure. The various bias voltages have the polarities as indicated on FIGURE 1. The voltage across Q3 is not critical and may be relatively high at both output terminals as long as the voltage across Q3 is within its voltage ratings and of the proper polarity.

Figure 3:
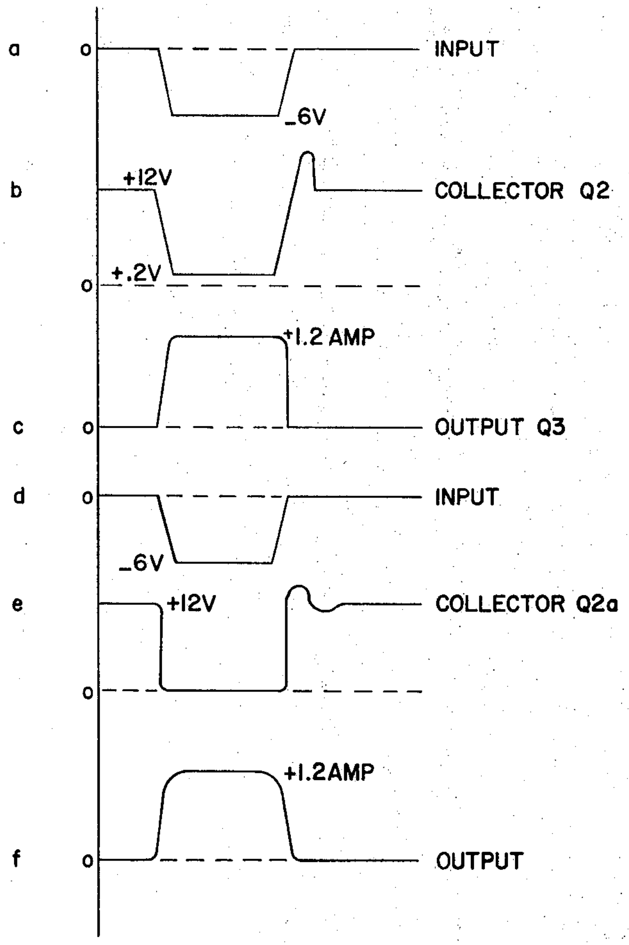
FIGURE 3 shows waveforms for both FIGURE 1 and FIGURE 2.

The waveforms in various portions of FIGURE 1 are shown in FIGURE 3*a*, *b* and *c*. The voltages and the current shown are typical for the particular circuit elements used. The waveforms are not drawn to the same scale.

Figure 2:
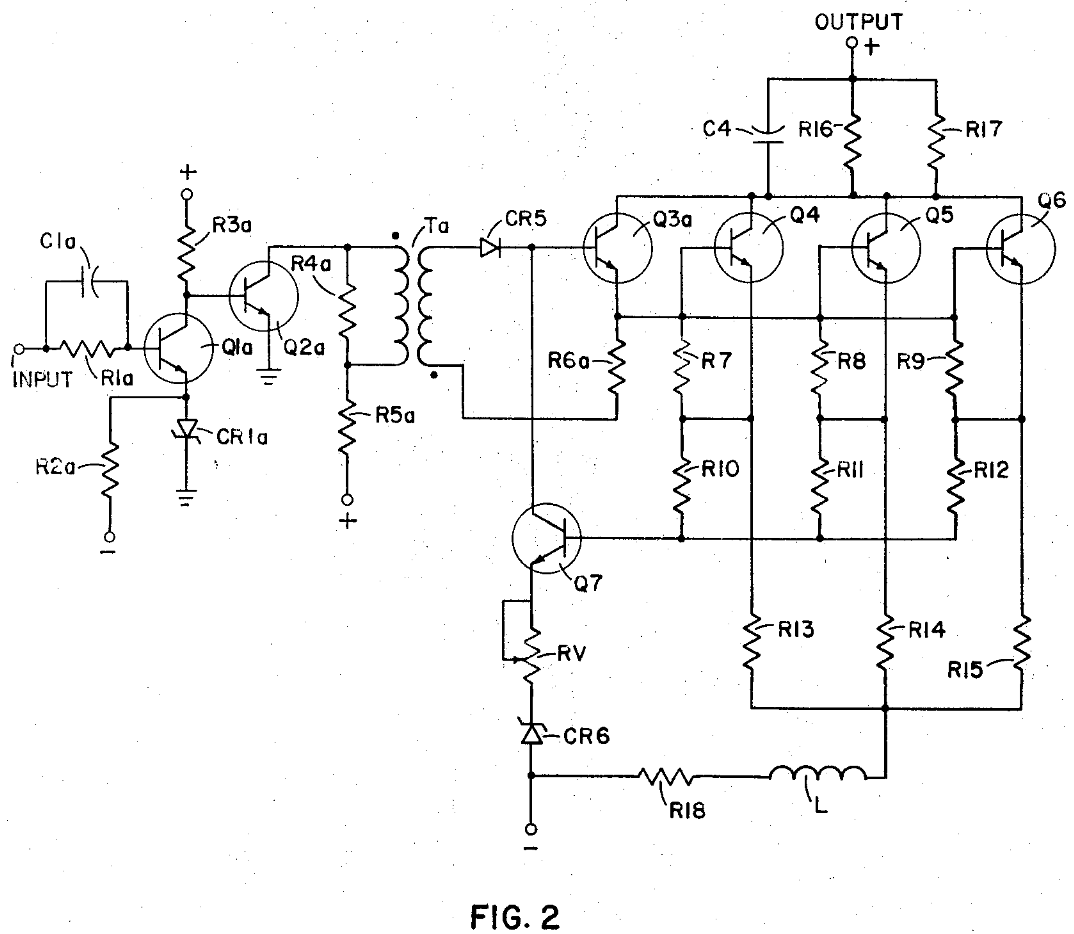
FIGURE 2 shows an alternative embodiment of the invention with additional circuit components added to regulate the current output of the device.

Referring now to FIGURE 2, circuit elements of equivalent function to those elements of FIGURE 1 are designated with the same numerals as in FIGURE 1, but with a suffix *a* added. Thus, in FIGURE 2, we have Q1*a*, Q2*a* etc. The circuit is substantially the same as FIGURE 1 up to transformer T*a*. Transistor Q3*a* is connected to transistors Q4, Q5 and Q6 in a triple Darlington arrangement. Resistor R6*a* acts as a limiter for the base drive of transistor Q3*a*. Resistors R7, R8 and R9 are emitter to base resistors to allow faster turnoff of their respective transistors. R10, R11 and R12 are balancing resistors for the voltage of the emitters of transistors Q4, Q5 and Q6. Resistances R13, R14 and R15 are current measuring resistors that establish a voltage which will match the voltage reference of the emitter of transistor Q7.

The operation of the FIGURE 2 circuit is as follows: Q1*a* is normally conducting. When Q1*a* is turned off by a negative input signal, it turns Q2*a* on. Transformer T*a* then drives Q3*a* which drives Q4, Q5 and Q6 in parallel. Transistor Q7 measures the drop in voltage across R13, R14 and R15 and shunts the base drive of Q3*a*. Zener diode CR6 provides a reference for Q7, and variable resistor RV is adjustable to provide the proper current. CR5 allows only the positive output from T*a* to reach the base of Q3*a*. Resistors R16 and R17 are power resistors to absorb some of the power, and capacitor C4 bypasses these resistors during the rise time of the current through the external load (not shown), which load may be inductive. Resistor R18 and choke L provide a connection for the negative voltage source to Q4, Q5 and Q6. FIGURE 3*d*, *e* and *f* show waveforms in the FIGURE 2 circuit.

Typical values of the passive components of the figures are as follows:

| Component(s): | | Value |
|---|---|---|
| R1, R1*a* | ohms | 1100 |
| R2, R2*a* | do | 300 |
| R3, R3*a* | do | 750 |
| R4 | do | 1000 |
| R4*a* | do | 2210 |
| R5 | do | 27 |
| R5*a* | do | 39.2 |
| R6 | do | 18.7 |
| R6*a* | do | 316 |
| R7, R8, R9 | do | 182 |
| R10, R11, R12 | do | 100 |
| R13, R14, R15 | do | 12 |
| R16, R17 | do | 24 |
| R18 | do | 866 |
| C1, C1*a* | picofarads | 100 |
| C2 | microfarad | 0.01 |

| Component(s): | | Value |
|---|---|---|
| C3 | picofarads | 4700 |
| C4 | microfarad | 0.027 |
| L | microhenry | 0.22 |

While specific embodiments of the invention have been shown and described, other embodiments may be obvious to one skilled in the art in view of the instant disclosure. For example, PNP type of transistors may be substituted for the NPN type of transistors as shown, with the appropriate changes in voltage supplies, etc. The compound values listed above are merely exemplary, and other values may be substituted, according to circuit requirements. While a plurality of transistors have been shown connected in a Darlington arrangement with transistor Q3*a*, it is obvious that a single transistor could be used in place of transistors Q4, Q5 and Q6.

We claim:

1. An electronic drive switch including a first normally conducting transistor having at least a collector and an emitter; a second normally nonconducting transistor having at least a base and a collector, with its base connected to the collector of said first transistor; a third normally nonconducting transistor having a base, an emitter, and a collector; D.C. isolating means connected between the collector of said second transistor and the base of said third transistor; first bias means connected to the emitter of said first transistor and the base of said second transistor; and second bias means connected to the collector of said third transistor; a fourth transistor having an emitter, a base, and a collector; a fifth transistor having at least an emitter and a collector; a two terminal resistor; said base of said fourth transistor connected to the emitter of said third transistor, said emitter of said fourth transistor connected to one terminal of said resistor, said collector of said fourth transistor connected to said second bias means, said collector of said fifth transistor connected to the base of said third transistor, and means connecting the emitter of said fifth transistor to the other terminal of said resistor; wherein said fifth transistor controls the base potential on said third transistor to maintain a constant current thorugh said fourth transistor.

2. The switch of claim 1 wherein said isolating means is a transformer.

References Cited

UNITED STATES PATENTS

| | | | |
|---|---|---|---|
| 2,962,626 | 11/1960 | Berg et al. | 307—260 X |
| 3,086,125 | 4/1963 | Gumin et al | 307—254 X |
| 3,289,008 | 11/1966 | Sommerfield | 307—253 X |
| 3,296,458 | 1/1967 | Fracassi et al. | 307—235 |
| 3,188,489 | 6/1965 | Dorsey | 307—265 XR |
| 3,322,966 | 5/1967 | Allmark | 307—268 |

DONALD D. FORRER, Primary Examiner

S. D. MILLER, Assistant Examiner

U.S. Cl. X.R.

307—237, 297, 315